United States Patent [19]

Phillips

[11] 4,062,147

[45] Dec. 13, 1977

[54] HORTICULTURAL CONTAINER ASSEMBLY WITH SAUCER DRAINAGE AND VENTILATION PASSAGE

[76] Inventor: Ronald L. Phillips, 4633 Dow Ridge, Orchard Lake, Mich. 48033

[21] Appl. No.: 674,384

[22] Filed: Apr. 7, 1976

[51] Int. Cl.² .................. A01G 9/02; A01G 9/04; B28B 7/16
[52] U.S. Cl. .......................... 47/71; 47/66; 47/79; 249/105; 249/142; 264/121
[58] Field of Search ............ 47/34 R, 34 A, 38, 34 D, 47/38.1, 34 S, 37, 66, 67, 71, 79–81; 249/141, 142, 105; 425/249, 812; 264/121

[56] References Cited

U.S. PATENT DOCUMENTS

| | | | |
|---|---|---|---|
| 1,264,096 | 4/1918 | Lelieure | 47/38.1 |
| 1,557,712 | 10/1925 | Little | 47/34 A |
| 1,561,824 | 11/1925 | Boehm | 47/71 |
| 1,707,559 | 4/1929 | Little | 47/34 A |
| 2,067,716 | 1/1937 | Landow | 47/34 R UX |
| 2,404,370 | 7/1946 | Fowlkes | 47/66 |
| 2,484,909 | 10/1949 | Ritter | 47/38 |
| 2,854,790 | 10/1958 | Hartung | 47/66 |
| 3,212,156 | 10/1965 | Derror | 249/141 X |
| 3,375,554 | 4/1968 | Blumer | 249/142 |
| 3,660,002 | 5/1972 | Morroni | 425/249 X |
| 3,949,524 | 4/1976 | Mickelson | 47/34 R |

FOREIGN PATENT DOCUMENTS

| | | | |
|---|---|---|---|
| 801,796 | 7/1949 | Germany | 47/34 |
| 131,635 | 5/1901 | Germany | 47/34 A |
| 878,121 | 7/1949 | Germany | 47/34 A |
| 1,005,303 | 3/1957 | Germany | 47/34 |
| 2,814 of a | 1905 | United Kingdom | 47/34 A |

Primary Examiner—Edgar S. Burr
Assistant Examiner—Steven A. Bratlie
Attorney, Agent, or Firm—Lowe, King, Price & Markva

[57] ABSTRACT

A horticultural container assembly including a container which has an open end pot and a hollow sub-base defined by an annular wall provided by an extension of the annular wall of the pot beyond the normal perforated base of such a pot, the annular wall of the sub-base terminating at a base rim for supporting the pot on a support surface with an inner peripheral wall thereof extending upward from the base rim to the perforated base and, a cup shaped saucer of a size to be telescopically received fully within the hollow sub-base by the inner peripheral wall. The perforated base, inner peripheral wall and base rim of the pot have means associated therewith for cooperatively providing with the saucer at least one drain-vent passage that is open at one end to the exterior of the sub-base of the container and having its other end in communication with the perforated base and with the interior of the saucer.

9 Claims, 6 Drawing Figures

HORTICULTURAL CONTAINER ASSEMBLY WITH SAUCER DRAINAGE AND VENTILATION PASSAGE

This invention relates to horticultural containers and, in particular, to a horticultural container and a saucer for same.

It is well known in the prior art to provide one or more drainage holes in the bottom of horticultural containers such as nursery and flower pots or containers. These drainage holes are provided in order to obtain two desirable results, that is, to permit the drainage from the pot of excess water to thereby prevent the roots of a plant, so to speak, from standing in water and to permit air to circulate more freely within the pot whereby promoting root growth with resulting faster growth of the plant potted therein. These nursery or flower pots of the prior art have been satisfactory when used in a nursery as by being embedded in the ground or placed on a porous support such as the ground.

However, for example, when these pots are used indoors for houseplants, they are normally used with saucers whereby the perforated bottom of the pot is directly supported on the non-porous flat base plate of the saucer or alternatively on some other non-porous support. Unless the person taking care of the houseplant allows all of the water to drain from the pot after watering and before placing the pot back into the saucer or if he or she waters the plant while the pot is still on its saucer, the pot may be standing in water after the soil or other planting mixture in the pot is wet. This in effect causes overwatering of the plant which is one of the most common problems with houseplants when cared for by the amateur horticulturist.

Furthermore, the conventional clay pot and saucer cannot be stacked as an assembly. When attempting to provide a stackable pot and saucer assembly, there typically results a complex structural arrangement having a highly visible elevated joint between pot and saucer. Such arrangements require costly complex molds having independently moveable cores or core inserts and dictate plastic injection molding where clay or some other material may be preferred for the pot and/or the saucer.

It is, therefore, the principal object of this invention to provide a horticultural container having an improved drainage and aerating means incorporated therein which can be used by itself or with a saucer telescopically received in the sub-base thereof.

Another object of this invention is to provide an improved horticultural pot and pot saucer which when assembled together define means to allow for the drainage of water from the pot while still permitting aeration of the growing contents of the pot.

A further object of this invention is to provide an improved horticultural container and saucer assembly which are stackable as a unit assembly.

Another object is to provide a simply moldable horticultural container having a container section and a perforated base and in addition a hollow sub-base having recesses therein for providing with or without a saucer associated therewith a drain-vent path in communication with one side of the perforated base and the exterior of the container.

These and other objects of the invention are obtained by a horticultural container assembly which includes a container and a saucer, the container including a pot portion having an upper portion including an annular upper wall upstanding from a perforated dish-like base and integral therewith to provide with the upper surface of the base a cavity for a plant or the like and a lower portion including an annular lower wall depending from the base, the inner peripheral surface of the lower wall providing a hollow sub-base for the pot portion of the container and, a cup shaped saucer slidably received and retained within the hollow sub-base beneath the perforations in the base of the pot, the sub-base and saucer having a drain-vent passage means formed by spaces between said sub-base and saucer in communication with one side of the perforated base and the exterior of the container.

For a better understanding of the invention as well as other objects and features thereof, reference is made to the following detailed description of the invention to be used in conjunction with the accompanying drawings, wherein.

Figure 1:
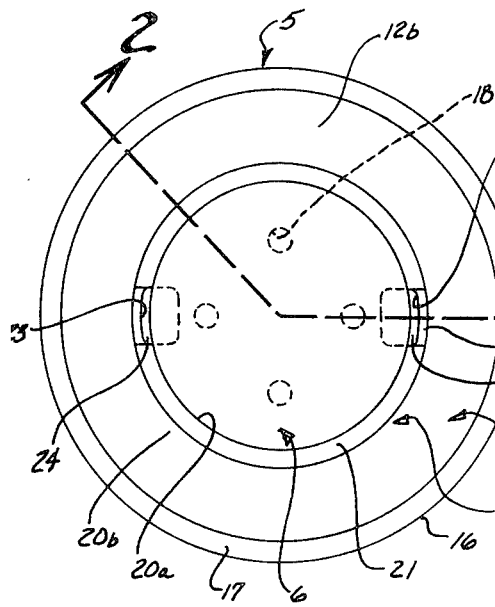
FIG. 1 is a bottom plan view of a horticultural container assembly in accordance with a preferred embodiment of the invention.
Figure 2:
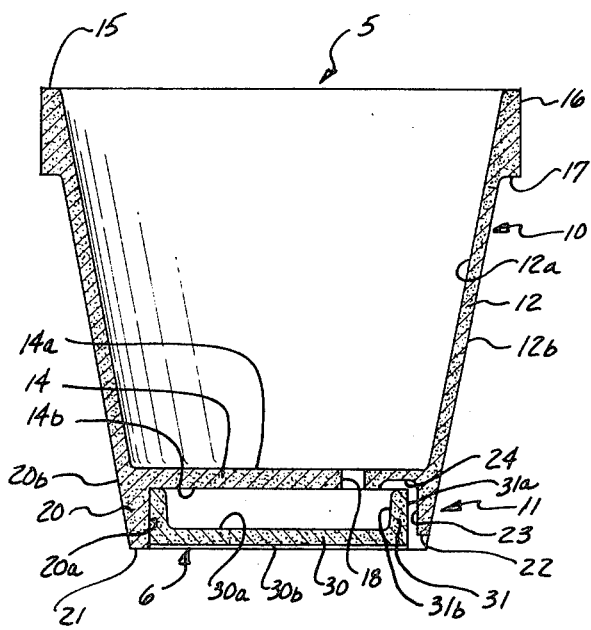
FIG. 2 is a sectional view of the horticultural container assembly of FIG. 1 taken along line 2—2 in FIG. 1.

Referring first to FIGS. 1 and 2, the horticultural container assembly of the invention includes an improved pot or container generally designated 5, and a saucer 6 for the pot or container when it is used for a houseplant, as an example. The pot or container 5 and the saucer 6 can be made of the same suitable material or of different suitable materials from those materials normally used in making prior art flower pots and saucers.

Preferably, these materials are such as to provide a porous cell structure with cells large enough to permit the passage of air therethrough to aerate the plant root growth within the pot and yet the cells are small enough to prevent the leakage out through the side wall or walls of the pot of the water and moisture from the soil content within the pot. However, it should be realized that, if desired, either the pot or the saucer, or both, can be made of a material so that it is pervious to both moisture and air or of a material so that it is impervious to both moisture and air.

However, in view of the constructional details of the pot or container 5 in accordance with the invention, such a structure, to be described, is readily adapted to be fabricated by a very simple low pressure and low heat molding process and, accordingly, both the flower pot or container 5 and the saucer 6, in a preferred embodiment, are made of a material consisting of sand particles bonded with a suitable resin. For example, the resin may be a synthetic resin such as either a thermosetting or thermoplastic resin and the mixture may comprise 85 to 98% by weight of sand particles and 2 to 15% by weight of resin. This mixture is readily blown by air pressure in a range such as 40–100 p.s.i., into a simple mold cavity, to be described, which is devoid of independently moveable cores and core inserts as will become more clear later, the mold being heated to a suitable temperature determined by the resin used and the desired cycle time.

Now, in accordance with the invention, the pot or container 5, hereinafter referred to as the container, of unitary construction, includes an upper portion 10 which, in effect, provides a hollow open end pot container of somewhat conventional configuration and a lower portion 11 which, in effect, provides a hollow open end sub-base for the pot container for a purpose which will become apparent. As stated above, the upper portion 10 of the container can be of any desired conventional configuration and, in the construction illustrated, is of truncated conical shape. Thus, as shown, the upper portion 10 of the container 5 includes an annular wall 12 extending upwardly and flaring radially outward from a disk-like base 14 to terminate at an annular upper edge rim 15, the inner conical surface 12a of the wall 12 forming, with the upper surface 14a of the base 14, a hollow pot container. To permit stacking of a plurality of containers, with or without their saucers 6, and without having them become wedged together so as to hinder their unstacking, the upper peripheral end of the upper portion 10 of the wall 12 of the pot is provided with an enlarged reinforcing outer peripheral rim 16 extending from the upper edge rim 15 that is connected by a lower radial flange 17 to the exterior conical surface 12b of wall 12. The extent between the upper edge rim 15 and flange 17 is at least equal to but preferably greater than the extent between the upper surface 14a of base 14 and the bottom of the sub-base 11 with saucer, to be described, of the container 5.

To permit drainage of excess water from the hollow pot container portion of the container 5, there is provided one or more drain holes 18 through the base 14, four such holes 18 being shown in the structure illustrated, these drainage holes being positioned a predetermined distance radially inward from the wall 12 so that drainage therethrough will fall into the cavity of the saucer 6.

The lower portion 11 of the container also includes an annular ring-like wall 20, the outer or exterior peripheral surface 20b of which is formed, in the embodiment illustrated, as a continuation of the exterior surface 12b and thus, in the construction illustrated would also be of conical configuration to extend a predetermined distance below the base 14 to terminate at a lower or support edge rim 21, which lies in a plane substantially parallel to the base 14 and, of course, also parallel to upper edge rim 15. The inner peripheral surface 20a of the wall 20 extends from the support edge rim 21 to the lower surface 14b of the base 14 to form therewith a hollow sub-base for the pot 5, the inner peripheral surface 20a of the sub-base being circular in the construction illustrated.

Referring now to the saucer 6, it is of cup shape and in the embodiment of FIGS. 1 and 2 is also made of sand and synthetic resin like the container 5. The saucer 6 includes a saucer base 30 with an annular upstanding side wall 31 extending therefrom and has an outer peripheral configuration corresponding to that of the interior of lower portion or sub-base of the container 5. The outer peripheral surface 31a of the side wall 31 of the saucer 6 should be of a dimension, the outside diameter in the construction illustrated, a predetermined amount less than that of the inner peripheral surface 20a of the container 5 whereby the saucer 6 can be slidably and telescopically received in the hollow sub-base of the container 5. The inner peripheral surface 31b of the wall 31 forms with the upper surface 30a of the base 30, an open end saucer container.

The overall height of the saucer 6 in this embodiment, can be equal to but preferably less than the extent or height of the inner peripheral surface 20a of the sub-base of container 5, especially on small sized containers, so that, when the saucer is used with the container, the container 5 will be supported on a support surface by its support edge rim 21 and not by the saucer 6. As is apparent, the support edge rim 21 of the container 5 has a larger effective support diameter, with reference to the construction illustrated, than that of the saucer 6, whereby this edge rim can provide more stability against tipping over of the container 5, especially if it has a top heavy plant potted therein. This difference in the height of the saucer 6 relative to the height of the cavity in the sub-base of the container 5 is illustrated in FIG. 2 by showing, for purpose of illustration only, the saucer 6 lifted up within the sub-base of the container 5 above the plane of the support edge rim 21. Obviously if the saucer 6 is loosely positioned in the end-base of the container 5, in normal use, the bottom surface 30b of the saucer 6 would also abut against the same support surface on which the support edge rim 21 rests.

Although the saucer 6 may be loosely positioned in the hollow sub-base of the container so that it can be removed when desired in order to use the container 5 without a saucer 6, as is common in a greenhouse, for houseplant use and to permit easy stacking of assemblies of containers 5 and saucers 6, suitable means may be provided, as will be apparent to those skilled in the mechanical and chemical arts, to secure a container 5 and saucer 6 together into a unit assembly. For example, in an assembly wherein both the container 5 and saucer 6 are made of a material consisting of sand particles bonded with a resin, as previously described, the saucer 6 may be bonded directly to the hollow sub-base of the container at their interfaces by the use of the same resin used in their fabrication.

To permit aeration and drainage of the interior of the sub-base of the container 5 and in particular the bottom or lower surface 14b of the base 14 of the container, the container 5 and saucer 6 cooperate to provide one or more suitable drain-vent passage means formed by spacing between the base 14 and the saucer 6 each of which is open at one end to ambient air exterior of the container and open at the other end to the space below the perforated base of the container and above the saucer.

In the embodiment illustrated, two such drain-vent passage means are used, with each including in this embodiment illustrated, a radialy extending passage through the wall 20 of container 5 as provided, for example, by a radial slot recess 22, in a preferred embodiment, extending upward from the support edge rim 21. Each such radial passage or slot recess 22 is in communication at one end with one end of the remainder of the elements of its associated drain-vent passage means, which includes, in the embodiment illustrated, a longitudinal passage associated with the interface between the outer wall of the saucer and the interior of the sub-base of container 5 that may be provided by a recess slot 23 in either the saucer 6, or container 5 or both, but preferably in container 5. Thus, each slot recess 22 is in communication with one end of a longitudinal slot recess 23 in the inner peripheral surface 20a of wall 20, the opposite end of slot recess 23 being in communication with a slot recess 24 provided in the bottom surface 14b of base 14, the slot recess 24 extending radially inward toward the center of base 14 a sufficient distance so that it terminates radially inward of the wall 31 of the saucer 6 whereby to be in direct communication with the interior of the saucer.

Preferably, the slot recess 24 does not extend into communication with a drain hole 18 so as not to form a direct path for water draining out of such a drain hole 18 whereby the water would then flow to the exterior of the container 5 instead of directly into the saucer 6.

Figure 5:
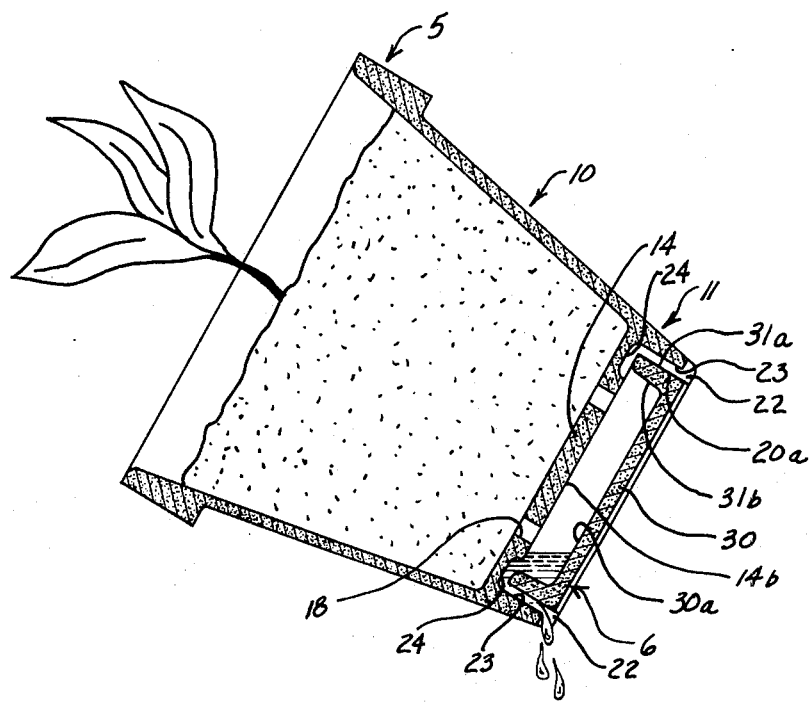
FIG. 5 is a sectional view of the horticultural container assembly of FIG. 1 but with the horticultural container assembly tilted to show how water can be poured from the saucer of this assembly.
Figure 6:
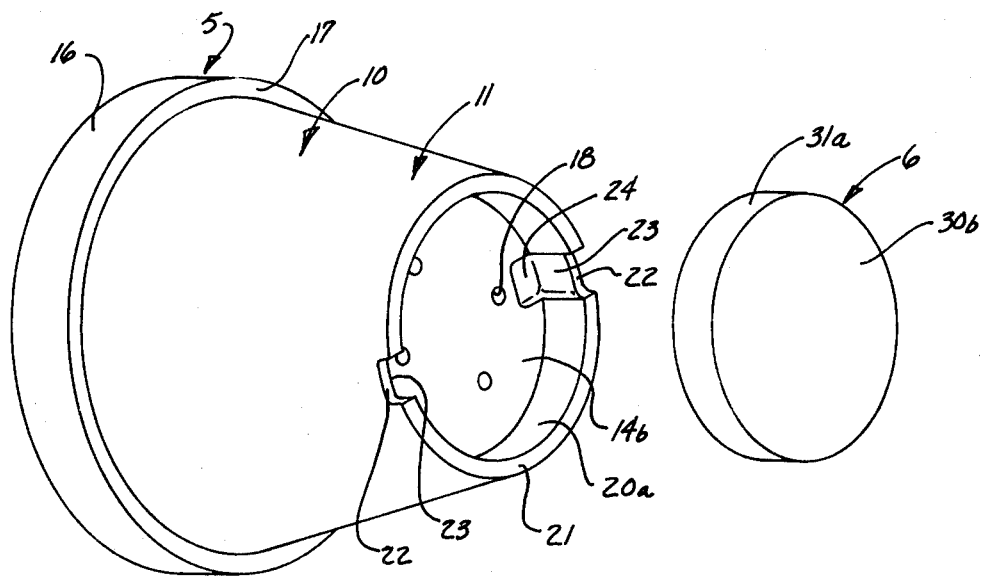
FIG. 6 is an exploded bottom perspective view of the horticultural container assembly of FIG. 1.

With this arrangement, if it is desirable to drain water from the saucer 6, when the saucer 6 and container 5 are a unit assembly, it is only necessary to tilt this assembly in the manner shown in FIG. 5 whereby water can then flow out over the rim of the saucer 6 into one of the vent passage means for discharge to the exterior of the container 5. Preferably, two diagonally opposite drain-vent passages are provided as shown so that in the tilted position the upper passage vents the space above the trapped water to facilitate drainage through the lower passage. Any dirt or other growing media which may have escaped from the pot container portion of the container 5 out through a drain hole 18 into the saucer 6 will be retained therein since it would settle into the corner between the side wall 31 and base 30 of the saucer 6 as seen in FIG. 5.

It should be realized, as described above, that the longitudinal passage could be formed, totally or at least in part in the side wall 31 of saucer 6, but this arrangement is less desirable than the construction illustrated because it would require rotational alignment of such a longitudinal passage in the saucer 6 with an associate radial passage in the container 5. In addition, by providing all of the means to form the drain-vent passage means in the container 5, these means are available in the container 5 when used with or without a saucer 6 or with a saucer other than the embodiment of saucer 6 illustrated in FIGS. 1 and 2, as will become apparent hereinafter.

Although the one or more radial extending passages through the wall 20 may take any desired shape and be located anywhere, as desired, so as to extend through the wall 20 to break out through the inner peripheral wall surface 20a of the container below the lower surface 14b of the base 14 thereof, it is preferred, for ease in fabrication and also for an esthetic purpose that such a radial passage be formed as a radial slot recess 22, as described, which of course may be of any desired cross-sectional configuration. It should also be realized that if two or more such radial slot recesses 22, extending upward from the support edge rim 21, are provided, these radial slot recesses will, in effect, divide the support edge rim 21 into two or more support pad sections, depending on the number of such radial slot recesses.

Figure 4:
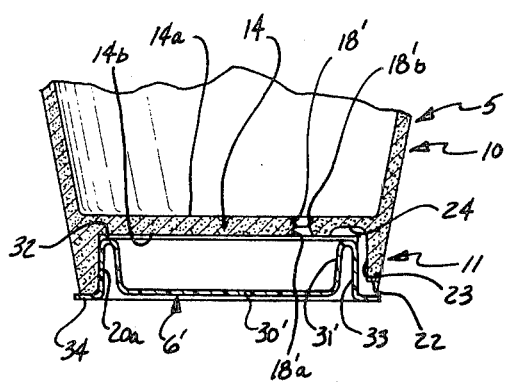
FIG. 4 is a sectional view of a portion of a container used with an alternate embodiment of a saucer, all in accordance with the invention.

Referring now to FIG. 4, there is shown an alternate embodiment of a thin-wall, light-weight saucer 6' for use with a container 5 of the same construction as previously described. Saucer 6', also of open end cup-like shape and preferably made for example of a suitable plastic material by injection molding, includes a disk-like base 30' with an upwardly extending annular inner cylindrical side wall 31' integral at one end with base 30' and at its other end with a return bend annular rim 32 connecting inner side wall 31' to one end of a depending outer side wall 33 spaced radially outward of and concentric to the inner side wall 31', the opposite end of the outer side wall 33 terminating at a radial outward extending annular flange 34.

As shown, the outer peripheral dimension of the outer side wall 33 of saucer 6' is of a predetermined size whereby this wall 33 can be slidably received by the inner peripheral surface 20a of the container 5 whereby saucer 6' can be slidably and telescopically received in the sub-base of container 5 and secured therein, if desired, for example by bonding in a manner similar to that previously described or as by an interference press fit of these elements. In addition, the outer peripheral edge dimension of the flange 34 should correspond to or be larger than that of the support edge rim 21 of the container 5 whereby the container 5 can be supported on a planar support surface with the flange 34 sandwiched between the support surface and the support edge rim 21 of container 5 whereby this flange 34 is used as a non-marring support for container 5. To effect this, the extent between the upper surface of flange 34 and the top of the return bend rim 32 of saucer 6' should preferably be slightly less than the extent between the support rim edge 21 and the lower surface 14b of the container 5. Thus, if the container 5 is made of an abrasive material, such as sand as described earlier, the plastic flange 34 of the saucer 6' serves to protect a furniture surface or other support surface on which the horticultural container assembly may be set.

If the container 5 is combined with a saucer 6' into a unit assembly, in order to permit stackability of such assemblies, the extent between the upper rim 15 and flange 17 of the container 5 should then be at least equal to but preferably greater than the extent between the upper surface 14a of base 14 and the bottom support edge rim 21 of the container plus the thickness of the flange 34 of saucer 6'.

Again with reference to FIG. 4, there is also illustrated an alternate embodiment of a drain hole 18' through the base 14 of the container that can be readily molded by using a pair of kiss pins in a pair of mold elements. As shown, each drain hole 18' is formed by a pair of interconnected truncated cone shaped apertures 18'a and 18'b inverted with respect to each other. As shown the aperture 18'b which extends from the upper surface 14a of base 14 has preferably a smaller diameter at its interconnection with aperture 18'a which extends from surface 14b than the diameter of aperture 18'a at its interconnection with aperture 18'b, thereby to reduce the path cross-sectional area for the possible flow of dirt out of the pot portion of container 5.

The particular construction of the container 5, as illustrated, permits it to be readily fabricated from the sand and resin material previously described by a simple low pressure and low heating molding process using, for example, permanent metal mold elements of simple configuration without the need of independently moveable cones or core inserts, thereby reducing the cost to fabricate these containers.

Figure 3:
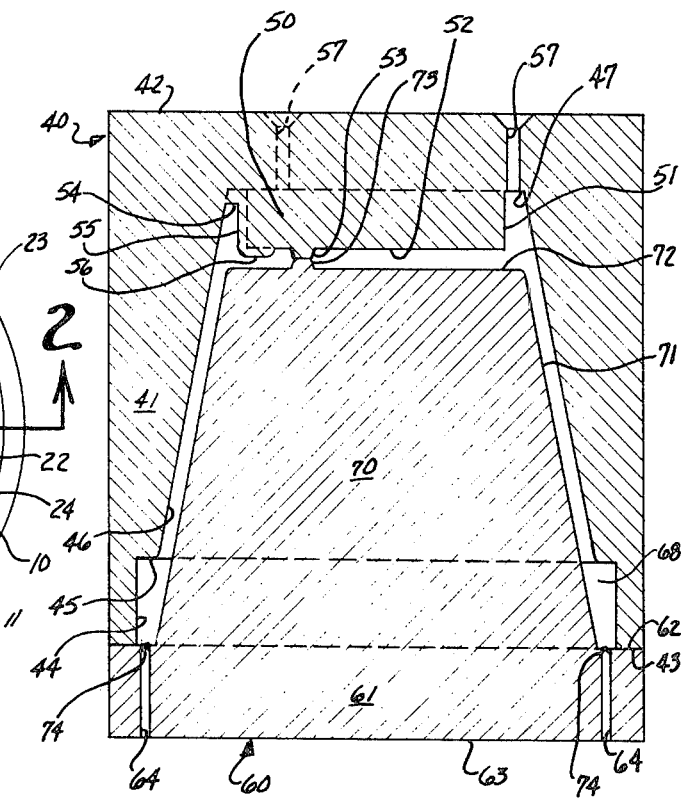
FIG. 3 is a sectional view of a mold used in fabricating the container of FIG. 1.

Thus, as shown schematically in FIG. 3, the mold elements would include an upper mold element or cope, generally designated 40, and a lower mold element or drag, generally designated 60, moveable with respect to each other between a molding position, the position shown, wherein the cope 40 and drag 60 are in abutment with each other along a parting line to be described, and a position in which these mold elements are in a spaced apart position relative to each other whereby to permit removal of a molded container 5 therefrom, as by leaving the cope 40 stationary while moving the drag 60 up into and down out of engagement therewith.

In the construction illustrated, the cope 40 includes a main body portion 41 having spaced apart upper and lower substantially planar surfaces 42 and 43, respectively. A cavity is provided in the body portion that extends inward from the surface 43, upward with reference to FIG. 3, as defined in succession by an inner annular wall 44 extending at right angle to surface 43, an annular radial flange wall 45 extending radially inward from wall 44 to connect with a radial inward tapered wall 46 that terminates at a second annular inward extending radial wall 47. Depending downward from the radial wall 47 to partly fill one end, or upper end, as seen in FIG. 3, of the cavity in body portion 41 is a male plug portion 50 providing a depending annular outer peripheral wall 51, of predetermined length, extending from the inner peripheral edge of radial wall 47 to terminate at a disk-like wall 52.

Depending from and integral with the wall 52 is one or more truncated-conical-shaped kiss-pins 53, each being used to form an aperture 18'a in the disk 14 of the container 5 of FIG. 4 as this container is being molded. In addition, in the construction illustrated, the radial wall 47, wall 51 and disk-like wall 52 are provided with one or more sets of interconnected ridges, such as radial ridge 54 depending from wall 47, radial outward extending longitudinal ridge 55 on wall 51 and depending radial inward extending ridge 56 on disk-like wall 52. If more than one set of such ridges is used, they should preferably be spaced apart equally in relation to each other to form during the molding process the drain-vent passages in a container 5, as previously described.

The main body portion 41 of cope 40 is also provided with a plurality of equally spaced apart conventional sprue openings 57 that extend from the upper surface 42 of the cope 40 to intersect the radial wall 47 all for a purpose well known in the molding or casting arts. These sprue openings 57, if aligned at right angles to the surface 42, can also serve to receive the usual ejector pins, not shown, to effect or ensure discharge of a molded container from the cope 40.

Drag 60 includes a main body portion 61 having spaced apart upper and lower substantially planar surfaces 62 and 63, respectively. Upstanding from the upper surface 62 is a truncated conical male plug portion 70 having an annular radially inward inclined outer peripheral surface 71 of predetermined height from surface 62, and an upper disk-like surface 72 that connects at its outer periphery to the upper edge of surface 71, the outside diameter of the plug portion 70 being of a size and the configuration of this plug portion being such so as to form with the cope 40, when positioned relative thereto as shown in FIG. 3 with the plug portion 70 positioned concentrically to wall 46 to cope 40 but radially inward thereof, a substantially enclosed mold cavity, generally designed 68 which is an image configuration to that of container 5.

In addition, the plug portion 70 is also provided with one or more truncated-conical kiss-pins 73, each of a size to form an aperture 18'b in the disk 14 of the container 5 of FIG. 4, the number of such kiss-pins 73 corresponding to the number of kiss-pins 53. Each set of kiss-pins 53 and 73 would be axially aligned with respect to each other and would be dimensioned so that their free ends would be in abutment with each other, when the cope 40 and drag 60 are positioned as shown in FIG. 3, to form during the molding process the apertures 18', as previously described.

As is well known, either the cope 40 or the drag 60, as is known, would be provided with a plurality of gas vent passages, such as the vent passages 64 in the drag 60 which extend from the upper surface 62 of the main body portion 61 of the drag to break out at the lower surface 63 thereof to be in direct communication with the mold cavity 68. Furthermore, a suitable screen 74 is provided in the mouth of each vent to prevent blockage while maintaining mold cavity integrity.

As shown, the parting line at the mating cope and drag surfaces 43 and 62 is thus at the upper edge rim 15 and therefore does not disturb the exterior pot surface. And it will also be understood that the parting line could be shifted to the radial flange 17 and still not disturb the exterior pot surface.

The above-described preferred embodiments are illustrative of the invention which may be modified by those skilled in the art within the scope of the appended claims.

I claim:

1. A horticultural container device for use with a removable saucer, said container including a longitudinally extending annular hollow wall having an open-end upper wall portion and an open-end lower wall portion, a disk extending transversely across the interior of said wall intermediate the ends thereof to separate said upper portion from said lower portion, one surface of said disk forming with said upper portion of said wall an open-end pot and the opposite surface of said disk forming with said lower portion of said wall a hollow open-end sub-base for said pot, said lower wall portion at the lower end thereof having a support rim, said disk having at least one drain aperture therethrough, and drain-vent passage means including at least one recessed slot extending radially through said support rim and an interconnecting recessed slot adjacent the inner peripheral surface of said lower portion of said wall extending longitudinally from said recessed slot in said support rim to said disk in communication at one end with the exterior of said wall and at its other end with a second interconnecting slot adjacent said opposite surface of said disk, whereby said drain vent passage means is continuous upon insertion of a saucer and formed between said saucer and said open-end sub-base by spacing between said saucer and said inner peripheral surface along said recessed slots.

2. A horticultural container device according to claim 1 further including a saucer of cup-shaped configuration, said saucer including a base disk having an upstanding annular wall extending therefrom to form therewith an open-end container, the outer peripheral surface of said saucer wall conforming in shape to the inner peripheral surface of said lower portion of said container wall and being of a size to be telescopically received in said sub-base for said pot, said recessed slot being formed in said inner peripheral surface of said lower portion of said container wall and forming with the outer peripheral surface of said annular wall of said saucer a longitudinal passage for said drain-vent passage means.

3. A horticultural container assembly including a container having a longitudinal extending hollow wall having an open-end upper wall portion and an open-end lower wall portion, a disk-like base extending transversely across the interior of said wall to separate the inner peripheral surface of said upper wall portion from the inner peripheral surface of said lower wall portion whereby to provide an open-end pot at the upper end and an open-end sub-base at the lower end, said lower wall portion at the lower end thereof having a support rim, a saucer of cup-shaped configuration in recessed position within said sub-base to close off the open-end of said sub-base, said saucer including a saucer base and a wall upstanding therefrom having an outer peripheral surface contacting substantially around the full inner peripheral surface of said sub-base to form an open-end reservoir beneath said disk-like base, said disk-like base having at least one drain aperture therethrough positioned for discharge into said open-end reservoir of said saucer, and at least two drain-vent passage means substantially oppositely arranged and formed by spaces interrupting the contacting surfaces of said sub-base and said saucer, said spaces being open at one end past said support rim to the exterior of said sub-base and open at their other end into said open-end reservoir of said saucer.

4. A horticultural container assembly according to claim 3, wherein each said drain-vent passage means includes a recessed slot extending through said support rim and a recessed slot in the inner peripheral surface of said lower wall portion to form with the outer peripheral surface of said wall of said saucer the spaces providing a longitudinal extending passage in communication at one end with said recessed slot in said support rim and at its other end to a surface of said base facing said open-end reservoir of said saucer.

5. A horticultural container assembly including a container having an open-end upper pot portion and an open-end lower sub-base portion, said upper pot portion including an apertured disk base and hollow wall upstanding from one surface of said apertured disk base, said sub-base portion including a hollow wall depending from an opposite surface of said apertured disk base and having an inner peripheral surface of a predetermined peripheral dimension and longitudinal height and configuration and a support rim at the lower end thereof, a cup-shaped saucer, said saucer including a saucer base and an upstanding wall extending from saucer base corresponding in configuration to said inner peripheral surface for surface-to-surface contact around substantially the full periphery therewith and of a predetermined peripheral dimension and longitudinal height less than that of said inner peripheral surface whereby said saucer is telescopically received in the interior of said sub-base portion in surface-to-surface contact therewith, securing means securing said saucer in said sub-base portion, and drain-vent passage means formed by spacing between said saucer and said sub-base portion including said support rim, open at one end to the exterior of said sub-base portion and at its other end through said spacing to the interior of said saucer and therefore to at least a portion of said opposite surface of said apertured disk base.

6. A mold for use in fabricating a horticultural container that is stackable with or without a saucer, the saucer being telescopically received in a hollow sub-base of the container, said mold including a cope means having a first surface and an opposed spaced apart second surface, a cavity means in said cope means extending upward from said second surface to terminate a predetermined distance inward from said first surface, said cavity means being defined in succession by an inner peripheral wall of a predetermined length extending upward from said second surface, an annular flange wall extending radially inward from said inner peripheral wall, a peripheral outer wall extending a predetermined distance upward from said flange wall while tapering radially inward and a disk-like end wall interconnected to the opposite edge of said outer wall, said flange wall and said outer wall together with said end wall having at least one set of continuous interconnecting ridges associated therewith, and, a drag means having a first surface and an opposed spaced apart second surface, said drag means including a male plug portion upstanding a predetermined distance from said first surface of said drag means, said male plug portion providing an upstanding outer peripheral wall of an outside dimension less than the inside dimension of said inner peripheral wall of said cope means and a disk-like plug end wall connected to the upper edge of said upstanding outer peripheral wall, said drag means being moveable relative to said cope means for movement between a first position in which said first surface of said drag means abuts against said second surface of said cope means with said male plug portion of said drag means extending into said cavity concentrically with said inner peripheral wall and with said plug end wall of said male plug portion spaced a predetermined distance from said end wall of said cope means, to a second position in which said drag means is in spaced apart relation to said cope means, said plug end wall and said end wall having at least one pin means associated therewith to substantially bridge the space between said plug end wall and said end wall when said drag means is in said first position relative to said cope means.

7. A method of molding a flanged horticultural container having a hollow sub-base and stackable with or without a saucer using two mold halves without independently moveable cores or inserts on either mold half comprising the steps of 1. forming the interior of the horticultural containing portion with a male plug on one mold half,
2. forming the exterior of both the horticultural containing portion and the sub-base portion with a female cavity in the other mold half,
3. forming the interior of the sub-base portion with a male plug that extends from the bottom of the female cavity to cooperate with the other male plug to provide the mold cavity for the base of the horticultural containing portion in a location so that the height of the flange portion of the container is substantially greater than the height of the bottom of the sub-base to the bottom of the horticultural containing portion,
4. forming a drain passage between the bottom of the horticultural containing portion and the top of the sub-base portion with a male plug extending from either one of the two afore-stated male plugs, and
5. forming a drain-vent passage in the interior of the sub-base and through the bottom support edge thereof with a raised core portion that extends continuously from the bottom of the female cavity and onto the male plug forming the interior of the sub-base.

8. A horticultural container assembly including a container having an open-end upper pot portion and an open-end lower sub-base portion, said upper portion portion including an apertured disk base and hollow wall upstanding from one surface of said apertured disk base, said sub-base portion including a hollow wall depending from an opposite surface of said apertured disk base and having an inner peripheral surface of a predetermined peripheral dimension and longitudinal height and configuration and an annular support rim at the lower end thereof, a cup-shaped saucer, said saucer including a saucer base and upstanding wall means extending from said saucer base having an outer peripheral wall corresponding in configuration to said inner peripheral surface for surface-to-surface contact around substantially the full periphery therewith and of a predetermined peripheral dimension and longitudinal height less than that of said inner peripheral surface whereby said saucer is fully telescopically received in the interior of said sub-base portion in surface-to-surface contact therewith, said saucer further including an annular flange extending radially outward from the lower end of said wall means and beneath said support rim, and at least one drain-vent passage means formed by spacing between said support rim and said inner peripheral surface of said sub-base portion and said annular flange and said outer peripheral wall of said saucer for opening the interior of said saucer along said spacing to the exterior of said sub-base portion past said support rim.

9. A horticultural container assembly including a one-piece pot having an open-end upper pot portion and an open-end lower sub-base portion, said upper pot portion having a perforated base elevated above said lower sub-base portion, said lower sub-base portion having an inner peripheral wall extending downwardly and outwardly from said base to terminate at a lower annular support rim, a saucer of elastic material and substantially uniform thickness including a saucer base having an annular upstanding inner wall extending therefrom and an outer wall outward of and connected by a U-bend annular rim to said inner wall and extending below and outward of said base, said saucer further including an annular flange extending radially outward from said outer wall, said outer wall of said saucer having a configuration to press fit with said inner peripheral wall while allowing said flange to abut with said support rim, and both said support rim and said inner peripheral wall of said sub-base portion and also the bottom surface of said pot portion having substantially oppositely arranged interconnected recessed slots for cooperating with said annular rim and outer wall and flange of said saucer to provide spacing forming substantially oppositely arranged drain-vent passages connecting the interior of said saucer past said support rim to the exterior of said sub-base portion.

* * * * *